United States Patent
Soffer (10) Patent No.: US 10,922,246 B1
(45) Date of Patent: Feb. 16, 2021

(54) SYSTEM AND METHOD OF POLYCHROMATIC IDENTIFICATION FOR A KVM SWITCH

(71) Applicant: High Sec Labs Ltd., Caesarea (IL)

(72) Inventor: Aviv Soffer, Caesarea (IL)

(73) Assignee: HIGH SEC LABS LTD., Caesarea (IL)

( * ) Notice: Subject to any disclaimer, the term of this patent is extended or adjusted under 35 U.S.C. 154(b) by 0 days.

(21) Appl. No.: 16/926,795

(22) Filed: Jul. 13, 2020

(51) Int. Cl.
G06F 13/10 (2006.01)
G06F 3/023 (2006.01)
G06F 13/40 (2006.01)

(52) U.S. Cl.
CPC ............ G06F 13/102 (2013.01); G06F 3/023 (2013.01); G06F 13/4022 (2013.01); G09G 2370/24 (2013.01)

(58) Field of Classification Search
CPC .. G06F 3/023; G06F 13/4022; G09G 2370/24
See application file for complete search history.

(56) References Cited

U.S. PATENT DOCUMENTS

| | | |
|---|---|---|
| 6,324,605 B1 | 11/2001 | Rafferty et al. |
| 6,388,658 B1 | 5/2002 | Ahern et al. |
| 6,559,833 B2 | 5/2003 | Rowe |
| 6,578,089 B1 | 6/2003 | Simpson et al. |
| 6,671,756 B1 | 12/2003 | Thomas et al. |
| 6,820,160 B1 | 11/2004 | Allman |
| 7,028,110 B2 | 4/2006 | Seki et al. |
| 7,113,978 B2 | 9/2006 | Beasley et al. |
| 7,240,111 B2 | 7/2007 | VanHarlingen et al. |
| 7,284,278 B2 | 10/2007 | Anson et al. |
| 7,320,071 B1 | 1/2008 | Friedman et al. |
| 7,333,031 B1 * | 2/2008 | Bantner ................ G06F 3/0238 341/22 |
| 7,478,235 B2 | 1/2009 | England et al. |

(Continued)

FOREIGN PATENT DOCUMENTS

| | | |
|---|---|---|
| CA | 2659480 | 9/2010 |
| CN | 104699615 | 6/2015 |

(Continued)

OTHER PUBLICATIONS

Machine translation KR 20180053502 A (Year: 2018).*

Primary Examiner — Glenn A. Auve
(74) Attorney, Agent, or Firm — Browdy and Neimark, PLLC (57) ABSTRACT

Systems and methods of a peripheral devices switching system configured to be connected to a plurality of host computers, including at least one set of peripheral devices, a peripheral devices switch that is to be coupled to said at least one set of peripheral devices and said plurality of host computers, where the peripheral devices switch assigns a color to each host computer, and couple between said at least one set of peripheral devices and an active host computer, and one or more polychromatic light sources that are being comprised in the peripheral devices switch, the at least one of the peripheral devices of the sets of peripheral devices or both, where the peripheral devices switch indicates the active host computer by illuminating at least one polychromatic light source by the color that is assigned to the active host computer.

21 Claims, 6 Drawing Sheets

(56) References Cited

U.S. PATENT DOCUMENTS

| | | |
|---|---|---|
| 7,502,878 B1 | 3/2009 | Wright |
| 7,559,092 B2 | 7/2009 | Anson et al. |
| 7,568,029 B2 | 7/2009 | VanHarlingen et al. |
| 7,613,927 B2 | 11/2009 | Holovacs |
| 7,635,272 B2 | 12/2009 | Poppe |
| 7,675,867 B1 | 3/2010 | Mraz et al. |
| 7,677,065 B1 | 3/2010 | Miao |
| 7,746,321 B2 | 6/2010 | Banning |
| 7,759,930 B2 * | 7/2010 | Colli ............... F15B 15/2861 324/207.24 |
| 7,774,774 B1 | 8/2010 | Mulligan |
| 7,853,740 B2 | 12/2010 | Liaw et al. |
| 7,873,498 B2 | 1/2011 | Chien et al. |
| 7,945,792 B2 | 5/2011 | Cherpantier |
| 8,090,961 B2 | 1/2012 | Yoffe et al. |
| 8,738,080 B2 | 5/2014 | Nhiayi |
| 8,769,172 B2 | 7/2014 | Soffer et al. |
| 8,943,373 B1 | 1/2015 | Angaluri et al. |
| 9,336,161 B2 * | 5/2016 | del Toro ............... G06F 3/038 |
| 10,585,731 B2 | 3/2020 | Soffer |
| 2002/0091850 A1 | 7/2002 | Perholtz |
| 2002/0120786 A1 | 8/2002 | Sehayek et al. |
| 2002/0166067 A1 | 11/2002 | Pritchard et al. |
| 2003/0035049 A1 | 2/2003 | Dickens et al. |
| 2003/0217123 A1 | 11/2003 | Anderson et al. |
| 2004/0107358 A1 * | 6/2004 | Shiakallis ............... G06F 21/34 726/9 |
| 2004/0177264 A1 | 9/2004 | Anson et al. |
| 2004/0201765 A1 | 10/2004 | Gammenthaler |
| 2005/0015980 A1 | 1/2005 | Kottilingam et al. |
| 2005/0022061 A1 | 1/2005 | Ozasa |
| 2005/0044266 A1 | 2/2005 | O'Neil |
| 2005/0246433 A1 | 3/2005 | Carrigan et al. |
| 2005/0073446 A1 * | 4/2005 | Lazaridis ............... G06F 3/0202 341/22 |
| 2005/0138433 A1 | 6/2005 | Linetsky |
| 2005/0216620 A1 | 9/2005 | Sandulescu |
| 2006/0031447 A1 | 2/2006 | Holt |
| 2006/0123182 A1 | 6/2006 | Sandulescu et al. |
| 2006/0143571 A1 | 6/2006 | Chan |
| 2006/0146491 A1 * | 7/2006 | Chen ............... G06F 3/023 361/679.08 |
| 2006/0230110 A1 | 10/2006 | VanHarlingen et al. |
| 2006/0267936 A1 | 11/2006 | Hoerl et al. |
| 2006/0280068 A1 | 12/2006 | Weirauch et al. |
| 2007/0033289 A1 | 2/2007 | Nuyttens et al. |
| 2007/0070042 A1 | 3/2007 | Lin et al. |
| 2007/0130573 A1 | 6/2007 | Farquhar |
| 2007/0174381 A1 | 7/2007 | Kitamura |
| 2007/0200858 A1 | 8/2007 | Hsieh et al. |
| 2007/0245165 A1 | 10/2007 | Fung |
| 2007/0260785 A1 | 11/2007 | Chen |
| 2007/0283450 A1 | 12/2007 | Anson et al. |
| 2008/0015087 A1 | 1/2008 | Negrin |
| 2008/0036741 A1 | 2/2008 | Hsieh et al. |
| 2008/0048975 A1 | 2/2008 | Lei Bow |
| 2008/0052442 A1 | 2/2008 | Matthews |
| 2008/0062121 A1 | 3/2008 | Huang et al. |
| 2008/0062632 A1 | 3/2008 | Liu |
| 2008/0081515 A1 | 4/2008 | Wu |
| 2008/0098307 A1 | 4/2008 | Corbefin |
| 2008/0102708 A1 * | 5/2008 | Wu ............... H01R 13/665 439/652 |
| 2008/0129692 A1 * | 6/2008 | Sween ............... G06F 3/0227 345/157 |
| 2008/0148339 A1 | 6/2008 | Hill |
| 2008/0163000 A1 | 7/2008 | McKim et al. |
| 2008/0178282 A1 | 7/2008 | Yoffe et al. |
| 2008/0198128 A1 | 8/2008 | Tsai et al. |
| 2008/0263232 A1 | 10/2008 | Guillot et al. |
| 2008/0288677 A1 | 11/2008 | Kirshtein |
| 2008/0309584 A1 | 12/2008 | Zhang |
| 2009/0013111 A1 | 1/2009 | Berland et al. |
| 2009/0033668 A1 | 2/2009 | Pederson et al. |
| 2009/0064273 A1 | 3/2009 | Buer |
| 2009/0106563 A1 | 4/2009 | Cherpantier |
| 2009/0150580 A1 | 6/2009 | Wen |
| 2009/0150664 A1 | 6/2009 | Zhang et al. |
| 2009/0204742 A1 | 8/2009 | Wiler |
| 2009/0212844 A1 | 8/2009 | Darmawan et al. |
| 2009/0222670 A1 | 9/2009 | Mehta et al. |
| 2009/0293136 A1 | 11/2009 | Campbell et al. |
| 2009/0296723 A1 | 12/2009 | Chang |
| 2010/0023744 A1 | 1/2010 | Markel |
| 2010/0100652 A1 | 3/2010 | Lin et al. |
| 2010/0083122 A1 | 4/2010 | Kozloski et al. |
| 2010/0110004 A1 | 5/2010 | Minutillo et al. |
| 2010/0211709 A1 * | 8/2010 | Chen ............... G06F 3/038 710/73 |
| 2010/0295859 A1 | 11/2010 | Stauffer et al. |
| 2010/0302169 A1 * | 12/2010 | Pance ............... G06F 3/0237 345/170 |
| 2011/0080342 A1 | 4/2011 | Haren |
| 2011/0145451 A1 | 6/2011 | Soffer |
| 2011/0200121 A1 | 8/2011 | Costa |
| 2011/0208963 A1 | 8/2011 | Soffer |
| 2011/0252153 A1 | 10/2011 | Vlodavsky |
| 2012/0042099 A1 | 2/2012 | Wong et al. |
| 2012/0047281 A1 | 2/2012 | Lee et al. |
| 2012/0154375 A1 | 6/2012 | Zhang |
| 2012/0159651 A1 | 6/2012 | Beacham |
| 2013/0050084 A1 | 2/2013 | Soffer |
| 2013/0054848 A1 * | 2/2013 | Huang ............... H01R 13/641 710/72 |
| 2013/0067534 A1 | 3/2013 | Soffer |
| 2014/0015673 A1 | 1/2014 | Soffer |
| 2014/0019648 A1 * | 1/2014 | Huang ............... G06F 3/0227 710/19 |
| 2014/0019652 A1 | 1/2014 | Soffer |
| 2014/0043750 A1 | 2/2014 | Calderone |
| 2014/0053256 A1 | 2/2014 | Soffer |
| 2014/0098485 A1 | 4/2014 | Vahid |
| 2014/0172422 A1 | 6/2014 | Hefetz |
| 2014/0289433 A1 | 9/2014 | Soffer et al. |
| 2014/0344494 A1 | 11/2014 | Zeung |
| 2015/0020189 A1 | 1/2015 | Soffer |
| 2015/0261598 A1 | 9/2015 | Balasubramanian |
| 2015/0365237 A1 | 12/2015 | Soffer |
| 2015/0378851 A1 | 12/2015 | Kobayasi |
| 2016/0077842 A1 | 3/2016 | Turnock |
| 2016/0203343 A1 | 7/2016 | Soffer |
| 2016/0227149 A1 | 8/2016 | Dickens |
| 2016/0371149 A1 | 12/2016 | Jinto |
| 2017/0256143 A1 * | 9/2017 | Montero ............... G06F 11/326 |
| 2020/0125771 A1 | 4/2020 | Soffer |

FOREIGN PATENT DOCUMENTS

| | | |
|---|---|---|
| CN | 103049343 | 4/2017 |
| EP | 1183614 | 8/2006 |
| EP | 2499595 | 9/2009 |
| GB | 2484736 | 4/2012 |
| KR | 20180053502 A * | 5/2018 |
| WO | WO 2003/009118 | 1/2003 |
| WO | WO 2004/107181 | 12/2004 |
| WO | WO 2006/062951 | 6/2006 |
| WO | WO 2006/090091 | 8/2006 |
| WO | WO 2009/018493 | 2/2009 |
| WO | WO 2010/200991 | 2/2010 |
| WO | WO 2013/3035098 | 3/2013 |
| WO | WO 2015/189841 | 12/2015 |
| WO | WO 2018/154569 | 8/2018 |

* cited by examiner

SYSTEM AND METHOD OF POLYCHROMATIC IDENTIFICATION FOR A KVM SWITCH

FIELD OF THE INVENTION

The present invention generally relates to keyboard, video, mouse (KVM) switching systems. More particularly, the present invention relates to systems and methods for indication of a selected/active host by a KVM switch.

BACKGROUND OF THE INVENTION

A KVM switch is a device that typically enables a single user to operate multiple computers (hosts) from a single set of peripheral devices. In some cases, where some of the hosts are more data sensitive than others, it may be recommended to prevent data leakage between host computers connected to KVM switches and between one or more networks connected to the host compntem. KVM switches that can maintain separation and/or isolation of data between host computers and/or data flowing through various elements of the KVM switch are usually called secured KVM switches.

One of the weakest links regarding security in KVM switches, in general, and in secure KVM switches, particularly, may be the user awareness of the host that the user is working on. It is important that the user is aware of the type of host the user is working on (e.g., which host is active), to, for example, avoid mistakenly working on an erroneous wrong host. For example, a. KVM switch can be connected to three host computer, host A, host B, and host C. The user of the KVM switch may operate the computer as if it is working on host A, when in reality the KVM switch is connected such that host B Is active. In this manner, errors can occur.

SUMMARY OF THE INVENTION

In some embodiments, the present invention provides a way to increase the user awareness to the host the user is currently working on, by assigning a color to the hosts and providing polychromatic indication to the active host that is attached to the user's set of peripherals.

There is thus provided, in accordance with some embodiments of the invention, a peripheral devices switching system configured to be coupled to a plurality of host computers, the system including: at least one set of peripheral devices, a peripheral devices switch that is configured to be coupled to said at least one set of peripheral devices and said plurality of host computers, where the peripheral devices switch assigns a color to each host computer of the plurality of host computers, and where the peripheral devices switch is configured to couple between said at least one set of peripheral devices and an active host computer of the plurality of host computers, and one or more polychromatic light sources that are being included in the peripheral devices switch, the at least one of the peripheral devices of the sets of peripheral devices or both. In some embodiments, the peripheral devices switch indicates the active host computer by illuminating at least one of the polychromatic light sources by the color that is assigned to the active host computer.

In some embodiments, the peripheral devices switch includes a remote control and the remote control indicates the active host computer by illuminating with one or more polychromatic light source the color that is assigned to the active host computer. In some embodiments, the set of peripheral devices includes a keyboard that includes one or more polychromatic light source located under or adjacent to one or more keys of said keyboard. In some embodiments, the set of peripheral devices includes a pointing device that includes one or more polychromatic light source.

In some embodiments, the set of peripheral devices includes a microphone and includes one or more polychromatic light source and when the microphone is open to the active host, the one or more polychromatic light source illuminate in the color assigned to the active host computer that receive the voice signal from said microphone. In some embodiments, the one or more polychromatic light source includes Red-Green-Blue (RGB) LEDs. In some embodiments, the one or more polychromatic light source includes two or more monochromatic light sources. In some embodiments, the peripheral devices switch is a secured peripheral devices switch.

There is thus provided, in accordance with some embodiments of the invention, a keyboard configured to be coupled with a KVM switch, the keyboard including: a plurality of standard keyboard keys. where the keys are associated with one or more polychromatic light sources, a controller, and an interface configured to enable communication between the controller and the KVM switch. In some embodiments, the keyboard controller is configured to receive instructions from the KVM switch, and condition upon said instructions the controller controls the one or more polychromatic light sources to illuminate the plurality of standard keyboard keys with the color assigned to an active host.

In some embodiments, the keyboard further includes a plurality of KVM control keys, where the keys include one or more polychromatic light source, each KVM control key is configured to select an active host by the KVM switch, the controller scans the plurality of KVM control keys and upon pressing any KVM control keys sends a message to the KVM switch through the interface, the KVM switch instructs the controller to illuminate the keyboard with a color assigned to the active host, and conditioned upon the KVM switch instruction the controller controls the one or more polychromatic light sources to illuminate the corresponding KVM control key with the color assigned to the active host. In some embodiments, the interface is one of (a) Serial; (b) PS/2; and (c) USB interface. In some embodiments, the illumination of the keys is performed using RGB LEDs. In some embodiments, the controller receives messages through the interface from the KVM switch on event of switching active host, said message includes color information. In some embodiments, the plurality of standard keyboard keys includes any one of or any combination of (a) Latin letters (a-z) keys, (b) digit keys, (c) punctuation keys, (d) symbol keys, (e) control keys, (f) function keys, (g) navigation keys, (h) numeric keypad keys, and (i) any non-Latin letter keys. In some embodiments, the plurality of standard keyboard keys complies with ISO/IEC 9995 keyboard standard series.

There is thus provided, in accordance with some embodiments of the invention, a method of indicating active host computer while working with a peripheral devices switch, the method including (a) assigning, by the peripheral devices switch a color for each host computer, (b) receiving, by a computing device a switching command that indicates a particular host computer of a plurality of host computers to be coupled to the peripheral devices switch. (c) coupling, by the peripheral devices switch, the active host computer to at least one set of peripheral devices, and (d) illuminating one or more polychromatic light sources to indicate the active host computer, where the illumination is with the color assigned to the active host computer.

In some embodiments, the peripheral devices switch further includes a remote control with polychromatic light sources, and where step (c) is performed by the polychromatic light sources of the remote control. In some embodiments, the set of peripheral devices includes a keyboard with polythromatic light sources, and where step (c) is performed by the polychromatic light sources of the keyboard. In some embodiments, in step (b) a selected peripheral devices is coupled to a selected host computer which is different from the host computer coupled to the other peripheral devices, and where in step (c) said selected peripheral device is indicated by illuminating the selected peripheral device using the assigned color for the selected host. In some embodiments, the polychromatic light sources are RGB LEDs. In some embodiments, the peripheral devices switch is secured peripheral devices switch.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention, in some embodiments thereof, relates to Keyboard, Video and Mouse (KVM) switching systems and, more particularly, but not exclusively, to indication of the selected/active host by a KVM switch. In some embodiments, a KVM switch is a device that enables a single user to operate multiple computers (e.g., hosts) from a single set of peripheral devices. In some embodiments, where at least some of the hosts are more data sensitive than others, it can be important to prevent data leakage between the host computers connected (e.g., directly connected via wired connections) to the KVM switch and between the networks coupled to the respective hosts. KVM switches that maintain data separation (e.g., data isolation) can be referred to as a secured KVM switch. One difficulty regarding security in KVM switches, in general, and in secure KVM switches, in specific, is the user's awareness of the particular host of a plurality of hosts the user is currently working with. It may be important that the user is aware of the active/selected host he works with. In some embodiments, the current invention addresses this issue.

In various embodiments, the KVM switch, the host computers, the peripheral devices and/or any components/devices of the system are connected electrically, mechanically or both. In various embodiments, the KVM switch, the host computers, the peripheral devices and/or any components/devices of the system are connected directly without any intermediary components or devices. In various embodiments, the KVM switch, the host computers, the peripheral devices and/or any components/devices of the system are connected via cables, connectors, wires, PCB traces, pins, switches and/or any other low ohmic resistance element that is used to establish galvanic connection between the components and/or devices.

In various embodiments, the KVM switch, the host computers, the peripheral devices and/or any components/devices of the system are connected through one or more passive or active intermediary components or devices.

In various embodiments, the KVM switch, the host computers, the peripheral devices and/or any components/devices of the system are arranged to cooperate with one another to provide a one or more desired functions.

According to some embodiments, a keyboard-video-mouse (KVM) switching system is provided to identify a selected or active host by a KVM switch. In some embodiments, the user switches between hosts by pressing keys that are located either on the KVM switch enclosure itself or, in the case where the KVM switch is not located close enough to the user, in a remote control of the KVM switch located near the user. The remote control can be referred to as Auxiliary Front Panel (AFP). Once the user switches to a particular host, that host can become an active host.

A host computer, on which the user desires to be the active host, may be selected by pressing on a key on the KVM switch or the KVM switch remote control. In a two hosts KVM switch system (e.g., a system that allows the user to be working on two computers with the same peripheral devices), two keys may be used by the user (e.g., two keys on the KVM switch or two keys on the KVM switch remote control) in order to switch between the two computers. Similarly, in a four hosts KVM switch system, four keys may be used by the user to switch between the four computers. In some embodiments, illumination indicators are associated with the keys, to, for example, drive the user's awareness to an active host. The indictors may he located in, on, in proximity to, or adjacent to one or more keys (e.g., the host selection keys). For example, assume there are three hosts and three keys on the KVM switch (or KVM switch with remote control), and host #3 is the active host, the illuminated indicator illuminates the corresponding push button key #3 or the corresponding indicator #3 is illuminated. In some embodiments, a remote control of the KVM switch having the indicators may be configured to be located on top of a computer display frame to, for example, provide an improved line of sight view between a user's eyes and an indication of the active host.

In some embodiments, the KVM switch enclosure or the remote-control enclosure may include one or two digits display that displays the host number, e.g., the digit '3' continuing with the above example, as the indicator. To ease the switching between hosts, some KVM switch may support selection of the active host using key-press combinations, also known as keys shortcuts, over the keyboard. For example, pressing 'Ctrl'+'Alt'+'1 ' keys on the keyboard limy switch an active host to host #1, and pressing 'Ctrl'+'Alt''2' may switch active host to host #2.

Figure 1:
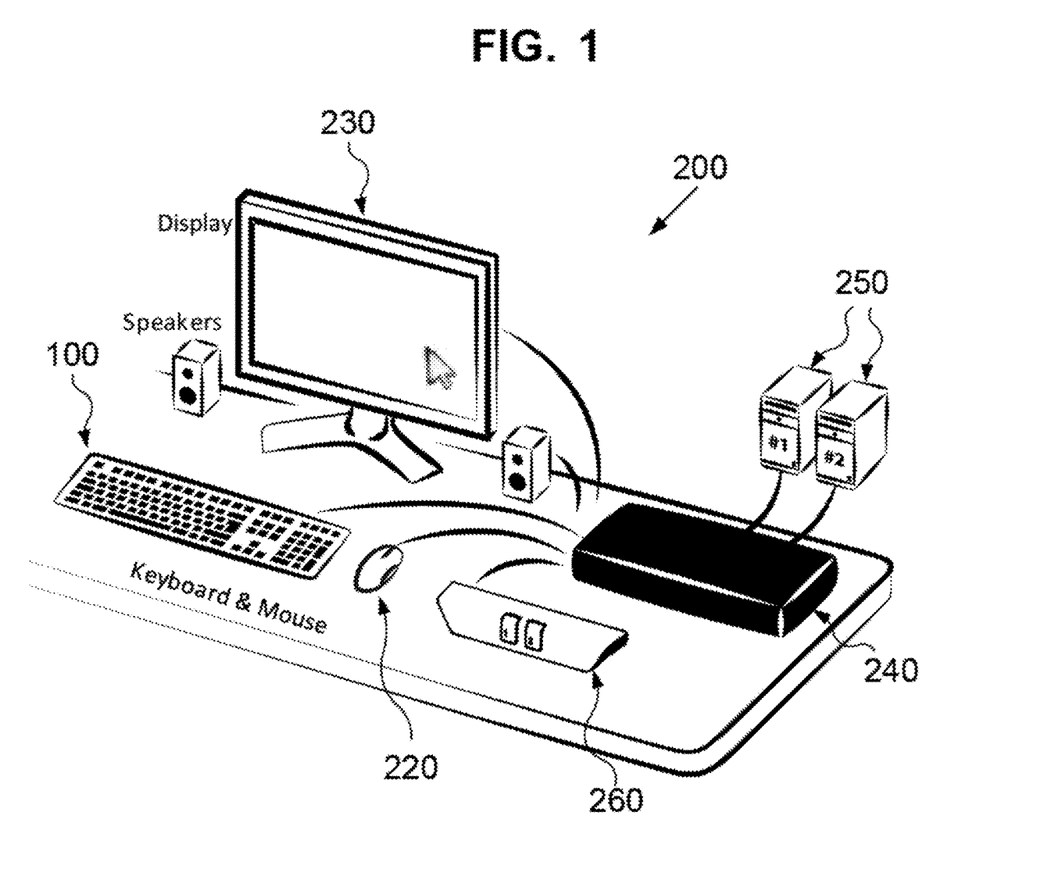
FIG. 1 is a schematic illustration of a typical configuration of a KVM switching system, in accordance with some embodiments of the present invention.

For purposes of better understanding some embodiments of the present invention, as illustrated in FIGS. 1-7 of the drawings, reference is first made to FIG. 1.

FIG. 1 schematically illustrates a typical system configuration with a switch. A system 200 includes a keyboard 100, a mouse 220. a display 230 (also known as a computer monitor), a KVM switch 240, a plurality of computer hosts 250, and in some embodiments a KVM remote control 260.

According to some embodiments, the system may further include speakers, headphone, microphone, printers and/or other peripheral devices such as external storage, card reader, such as smart card reader for authentication, etc. (not shown in FIG. 1). Hosts 250 of system 200 may be coupled to local area networks (LANs) or any other communication networks. The network coupled to each host may be of a different security level. For example, one network is an unclassified network that is connected to the Internet, while the other network is a classified network and is only internal in an organization or a campus The hosts 250 may be electrically and/or mechanically coupled to the LANs and/or any other communication networks. The hosts 250 may be directly connected or coupled to one or more of the LANs and/or one or more of any other communication networks without any other devices in between. In various embodiments, the connections are through cables, electrical connectors, wires, PCB traces, pins, switches, and/or any other low ohmic resistance element that is used to establish galvanic connection between elements.

According to some embodiments, the KVM switch 240 is configured to couple to keyboard 100 and/or mouse 220 and/or display 230, and allows the user to control multiple computers (or hosts) 250 from a single set of peripherals, such as, keyboard 100, video monitors 230, and mice 220. In some embodiments, the KVM switch 240 allows switching two or more video monitors 230 and/or three or more user interface devices (e.g., in USB :standard as Human Interface Devices (HID)) as well as audio peripherals, such as, speaker and microphone, other USB devices, such as, ID card readers, and/or other devices as are known in the art to couple to and be switched by a KVM switch.

In order to switch between hosts 250, the user may press a dedicated push button located on the enclosure of KVM switch 240. Upon receiving and/or processing of the host switching command, the corresponding indicator in KVM switch 240 may be illuminated. The number of computers or hosts 250 that can be coupled to the KVM switch may be two, as illustrated in FIG. 1. In some embodiments the hosts themselves may reside in remote locations, such as, in data centers.

In some embodiments, KVM switch 240 may be located out of reach of the user. For example, the KVM switch 240 may be few meters away from the user's desk in the other side of the room or up-to many kilometers away in different premises. In such cases, a distance extender device, coupled between the user peripherals 100, 220, 230 and the KVM switch 240, may be used. The distance extender's media may include a USB cable, a category 5 cable that can carry Ethernet family protocols, an optical fiber or the like.

In some embodiments, a remote control can be used to switch between hosts. For example, when the user cannot reach, or cannot easily reach, the KVM switch 240 push button keys on the KVM switch enclosure, a remote control 260 may be used. To switch between hosts 250, the user may press a push button located on the enclosure of remote control 260. Upon receiving a switching command by remote control 260, remote control 260 sends the switching request command to KVM switch 240. After processing this command by KVM switch 240, KVM switch 240 may send back a switching acknowledge to KVM remote control 260 and then KVM remote control 260 illuminates the proper indicator.

In some embodiments, securing the KVM system from cyber-attacks is desired. The secure KVM may have several levels of security. One level includes a "whitelist" or authorized peripheral devices that are allowed to be coupled to KVM switch 240. Another level is to enforce only unidirectional communication to further isolate between the hosts so that no data (or substantially no data) can be leaked between the hosts. In some embodiments, data from the HID device may only flow to the host and for the video stream, data may only flow from the host to the display. In some embodiments, EDID reading or USB device enumerations may be used for bi-directional communication that is needed in the initialization setup. This bi-directional communication may be made secured by allowing it only in KVM power-up and using a host emulator and/or peripheral device emulators in order to communicate this data between the peripheral devices and the host whenever it is needed.

Figure 2:
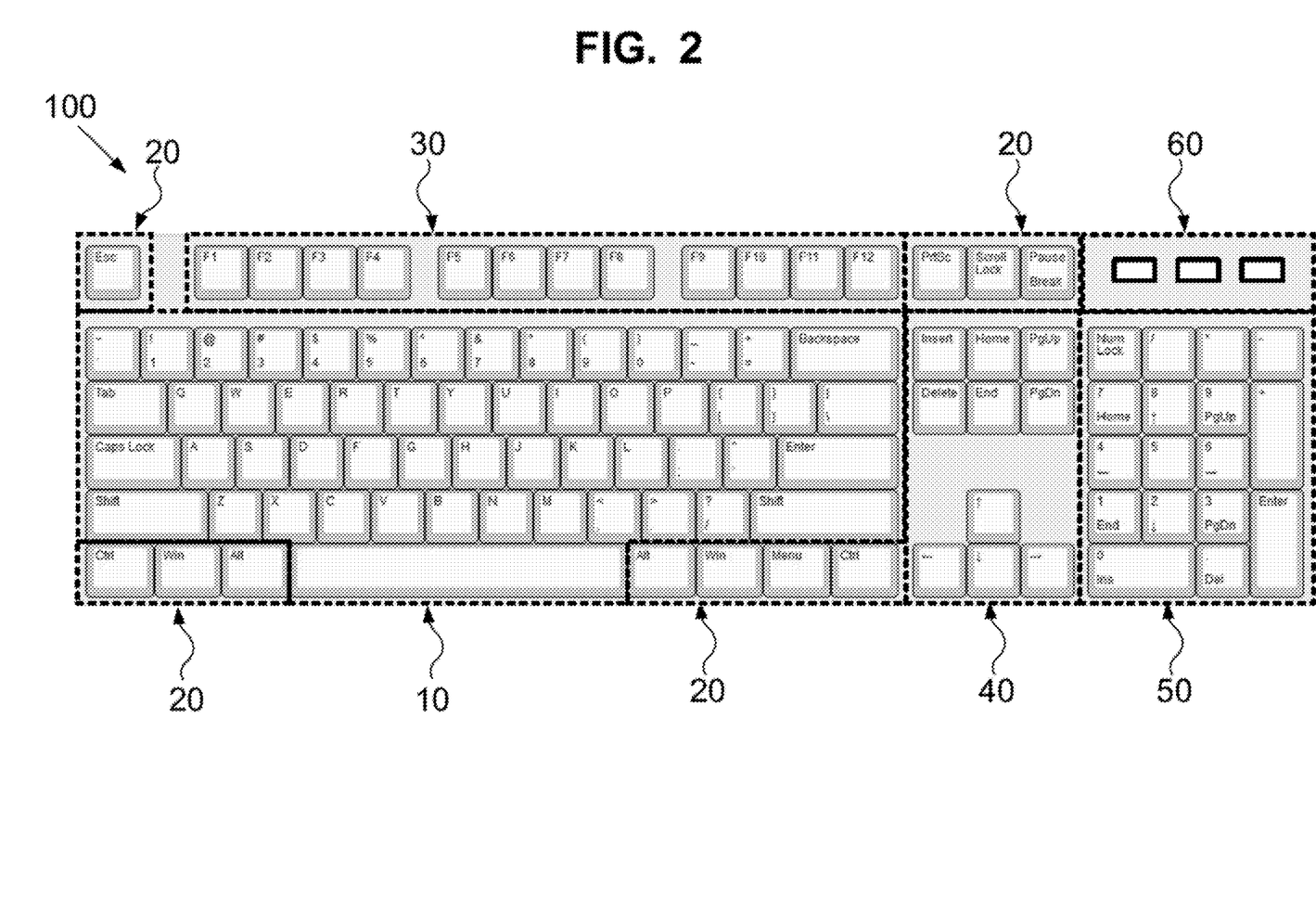
FIG. 2 is an illustration of a standard QWERTY keyboard used, in accordance with some embodiments of the present invention.

Reference is made now to FIG. 2. FIG. 2 illustrates a standard QWERTY keyboard 100 including alphanumeric keys 10, control keys 20, function keys 30, navigation keys 40, and numeric keypad 50. The keyboard 100 may also include three illuminated indicators to indicate locked states that can be activated by the three lock keys: Caps Lock, Num Lock and Scroll Lock. The Caps Lock key is used for entering capital letters, the Num Lock key is used to switch between digits and the navigation keys in the numeric keypad, and Scroll Lock key originally used together with the arrow keys to either scroll the contents of a text window or to moving the cursor on the text window.

In some embodiments, the "KVM switch" includes a device that switches, e.g., couples, between a plurality of host computers and at least one set of peripheral devices. In various embodiments, the set of peripheral devices may include a single peripheral device (e.g., a mouse) or a plurality of peripheral devices provided as a set (e.g., a keyboard and a mouse). The set of peripheral devices may include of at least one of a keyboard (K) and a mouse (M). In various embodiments, the mouse is a track ball, touch pad or the like. In some embodiments, the set of peripheral devices may further include a video display (V). The video display, also referred as the computer monitor, may be any device presenting visual information to the user, including, but not limited to, cathode-ray tube CRT display, Plasma Display, Liquid Crystal Display (LCD). Light-Emitting Diode (LED) display and the like. The computer monitor may come in apparatus form-factor of computer monitor, TV set, head-mounted display, video projector and the like.

In some embodiments, the set of peripheral devices includes a plurality, e.g., two or four, computer monitors. The set of peripheral devices may further include at least one of, or any combination of, audio devices such as speaker or headset to enable hearing voices or sounds transmitted from the host computer, a microphone to enable transmission of voice from the user to the host computer, an IP telephone handset to perform telephone calls through the host computer network, a video camera to perform video tele-conferencing, a user authentication device, such as, fingerprint reader, biometric reader, token generator reader, Common Access Card (CAC) reader, Personal Identity Verification (PIV) card reader, smartcard reader and the like. The set of peripheral devices may further include other personal use peripheral devices such as personal printers, personal scanners, personal USB devices and the like.

In some embodiments, peripheral devices switch is the switch positioned between the one or more peripheral devices and the plurality of hosts, for instance as an alternative to the KVM switch. In some embodiments, the peripheral devices switch switches between peripheral devices such as Keyboard, Video monitor and Mouse peripheral devices as well as all other devices mentioned above, such as microphone, smartcard readers and the like. In some embodiments, the peripheral devices switch includes a KVM switch as well as a KM (Keyboard and Mouse only) switch, a KVM (video) combiner, a USB devices switch, an audio devices switch, or any similar device that switches. In some embodiments, the peripheral devices switch is coupled to a set of one or more peripherals and a plurality of hosts. In some embodiments, the peripheral devices switch is coupled between a set of one or more peripherals and a plurality of hosts. In some embodiments, the peripheral devices switch includes both a KVM switch and a KVM matrix, or peripheral devices matrix, which means a device that may switch, coupled between multiple sets of peripheral devices and multiple host computers in a way that a plurality of users may work simultaneously with a plurality of host computers wherein no two users are simultaneously operating with the same host computer.

According to some embodiments, additional feedback is provided by the system to indicate the active host, e.g., the current host the user is working with, and the current host the KVM switch is coupled to the set of the peripheral devices operated by the user. In some embodiments, in order to provide additional feedback each of the different hosts coupled to the KVM switch is coded with a distinct color, and providing this color indication, by light illumination by indicators in at least one of or the combination of (a) the KVM switch enclosure and/or the KVM remote control enclosure; and (b) at least one of or any combination of the peripheral devices in the peripheral device set, operated by the user.

Figure 3:
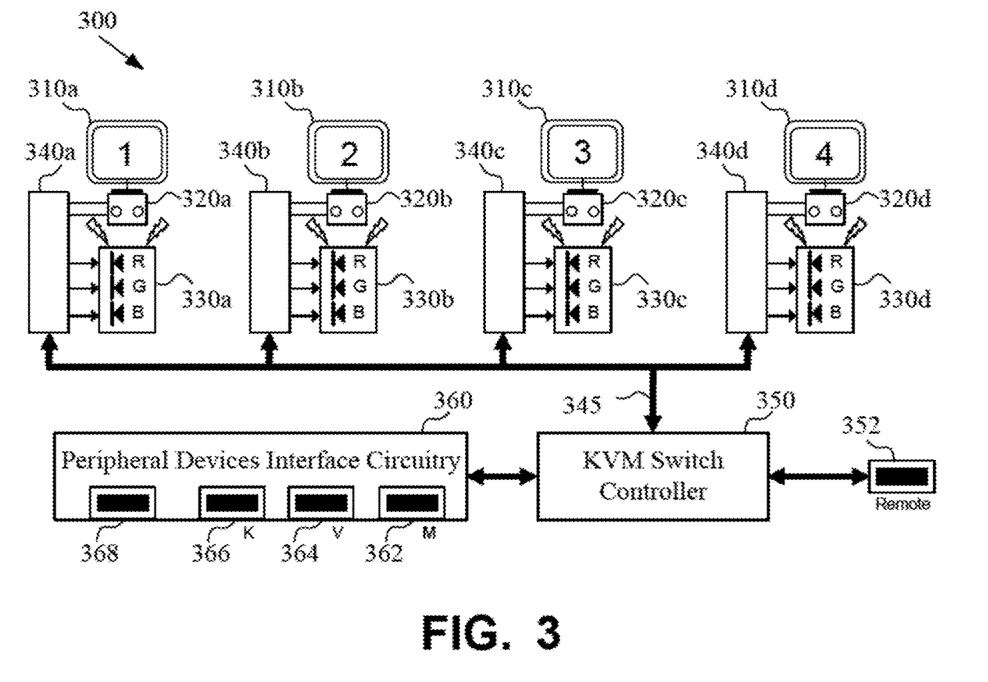
FIG. 3 is a schematic block diagram that shows a portion of a KVM switch in accordance with some embodiments of the invention.

Reference is made now to FIG. 3. FIG. 3 is a schematic block diagram that shows a portion of a KVM switch 300 in accordance with an embodiment of the invention. The KVM switch 300 includes keys 310*a*, 310*b*, 310*c* and 310*d*(e.g., push-buttons) that select the active host when pressed (e.g., key 310*b* corresponds to host #2). These keys may be located in the front panel of KVM switch 300 enclosure. Each key is mechanically coupled to a switch 320*a*, 320*b*, 320*c* and 320*d*. Switches 320*a*, 320*b*, 320*c* and 320*d* are coupled respectively to key interfaces 340*a*, 340*b*, 340*c* and 340*d*. Key interfaces 340*a*, 340*b*, 340*c* and 340*d* are coupled to a KVM switch controller 350 through connection 345. When a key 310*a*, 310*b*, 310*c* or 310*d* is pressed, KVM switch controller 350 may receive this event and change the active host accordingly. For the sake of clarity, all KVM switch 400 circuitries of the switch itself and all the circuitries between the set of peripheral devices interface and the host computer interface are not shown in FIG. 3.

Each one of the key interfaces 340*a*, 340*b*, 340*c* and 340*d* is coupled to a polychromatic light source 330*a*, 330*b*, 330*c* and 330*d* respectively. In some embodiments of the invention, the polychromatic light source includes one or more RGB LEDs that include illumination from Red LED, Green LED and Blue LED. Additionally, the polychromatic light source may include two or more monochromatic light sources. Upon changing the active host computer. KVM switch controller 350 may control, using key interfaces 340*a*, 340*b*, 340*c* and 340*d*, the polychromatic light sources 330*a*, 330*b*, 330*c* and 330*d*.

Herein and hereinafter, the suffix 'x' in 330*x* or 340*x* or any other reference signs may mean each, any or all similar elements, hence 340*x*, in this case, means any of 340*a*, 340*b*, 340*c* and 340*d*.

The key corresponding to the active host computer may be illuminated with the. color assigned (or associated) to this host computer, while other keys illumination is turned off. Additionally or alternatively, KVM switch controller 350 may send a command to a remote control via interface 352 to set an indication of the current active host in the remote control. Additionally or alternatively, KVM switch controller 350 may send a command to set a polychromatic indication of the active host to any one of or any combination of the set of peripheral devices via peripheral devices interface circuitry 360. Peripheral devices interface circuitry 360 includes an interface to keyboard 366, in some embodiments, one or more interfaces to a video display 364, interface to a mouse or a pointing device 362, and in some embodiments one or more interfaces to additional. peripheral devices such as CAC card reader, microphone, etc.

In some embodiments of the invention, the selection of the active host computer may be initiated by external trigger and not by pressing keys 310a, 310b, 310c and 310d of KVM switch 300. For example, as presented in detail hereinafter, the command for selecting different host computer may be initiated by the remote control or one of the devices in the set of peripheral devices. In such case, KVM switch controller 350 may update its own indications by proper illuminating commands to any indication in polychromatic light source 330a, 330b, 330c and 330d and by sending the proper commands, if necessary, to the remote control and the peripheral devices.

Figure 4:
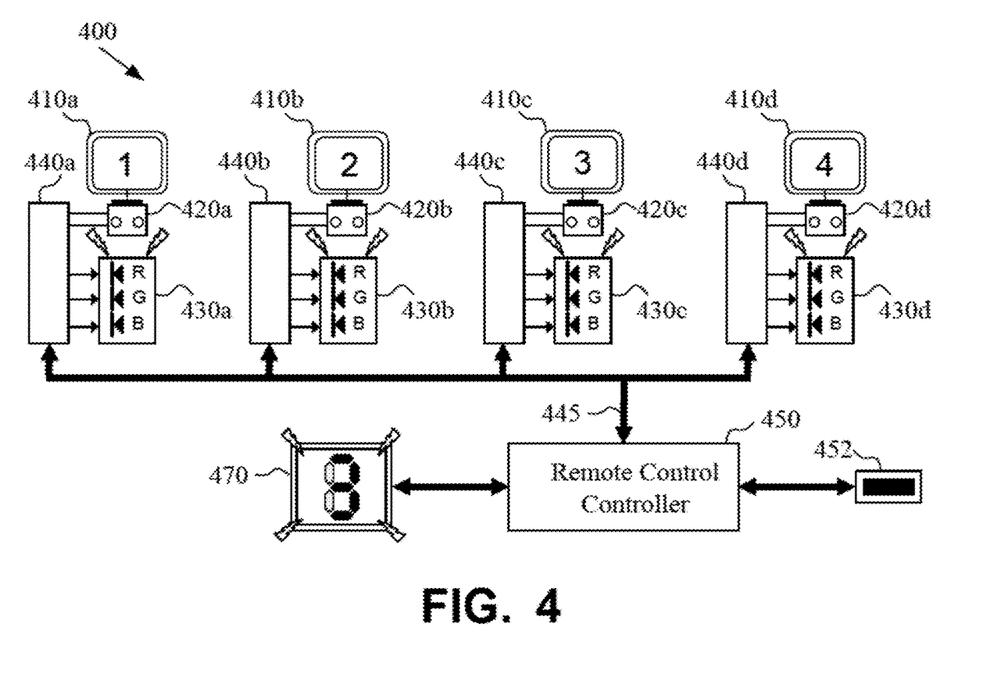
FIG. 4 is a schematic block diagram of a remote control of the KVM switch, in accordance with some embodiments of the invention.

Reference is now made to FIG. 4. FIG. 4 is schematic block diagram of a remote control 400 of KVM switch 300 in accordance with an embodiment of the invention. In some embodiments, the host selection keys and the active host indication have similar elements to the one presented in KVM switch 300 (shown in FIG. 3).

The KVM block diagram of a switch remote control 400 includes four keys 410a, 410b, 410c and 410d; four switches 420a, 420b, 420c and 420d; four polychromatic light source 430a, 430b, 430c and 430d; and four key interfaces 440a, 440b, 440c and 440d. The key interfaces 440a, 440b, 440c and 440d are coupled to a remote-control controller 450 via connection 115.

In some embodiments of the invention, the number of supported hosts by the KVM switch may be in the range of 2-8. In some embodiments, the number of supported hosts may be any other natural number, n, and the numbers of keys 410x as well as elements 420x, 430x, 440x may be respectively 'n' too.

Suppose the present active host is host #2, then remote-control controller 450 may command the polychromatic light source 430b to illuminate with the color associated with host computer #2. Polychromatic light sources 430a, 430c and 430d may be controlled by remote-control controller 450 to off-state, e.g., no illumination. When the user presses key 430c, remote-control controller 450 receives this event and sends this event via interface 452 to KVM switch 300. Interface 452 is coupled by a cable to interface 352. Additionally or alternatively, the KVM remote control and KVM switch may be coupled via wireless connection.

The request to switch from host #2 to host number #3 may be processed in KVM switch 300 and as a result it produce back to remote control 400 command to turn-off the indication of host #2 and command to turn-on the indication of host #3 by illuminating key 410c(by polychromatic light sources 430c) with the color associated with host #3.

Additionally or alternatively, remote control 400 includes an active host indicator 470. Active host indicator 470 may include a digit display and background display. The background display may be illuminated with the color assigned to the active. host and the digit display displays the digit corresponding to the channel number so with regards to the above example, before the host switch the digit display was displaying the digit '2', and after the host switch, the digit display displays the digit '3'. The color of the digit is either black (e.g., illumination off) or illuminated with a color that creates a good contrast to the color assigned to the active host (e.g., to attract the awareness of the user).

In some embodiments of the invention, the background display and digit display may be a 2D pixel array display wherein the digit and the background are created by manipulating the pixels of the image displayed by the 2D pixel matrix. Additionally or alternatively, digit display may be a seven-segment display and background display is a flat surface illuminates by one or more polychromatic light sources. Active host indicator 470 may be controlled by remote-control controller 450 in according to the command received from KVM switch 300.

Figure 5A:
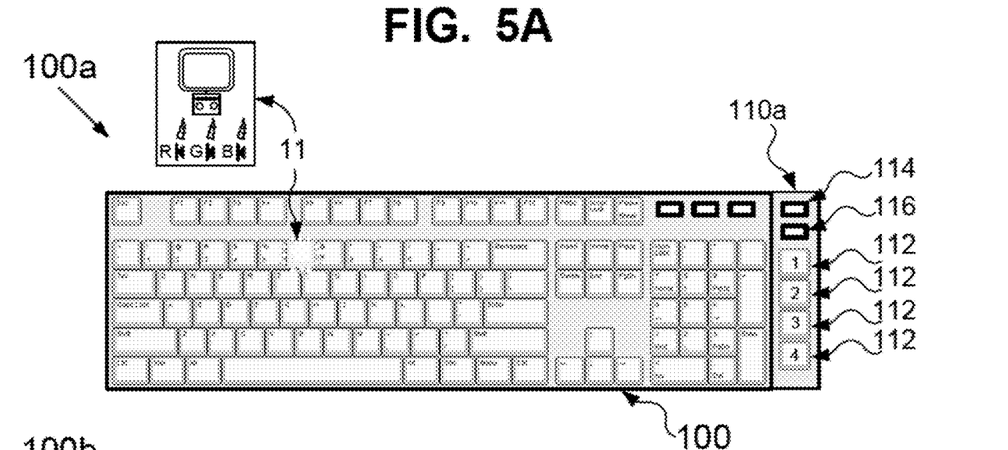
FIGS. 5A-5C are illustrations of several variants of keyboards that support a KVM switch, in accordance with some embodiments of the invention.
Figure 5B:
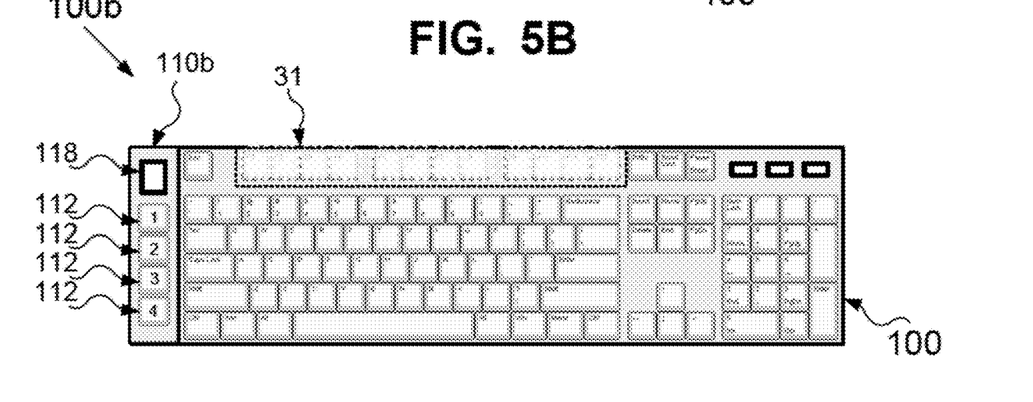
Figure 5C:
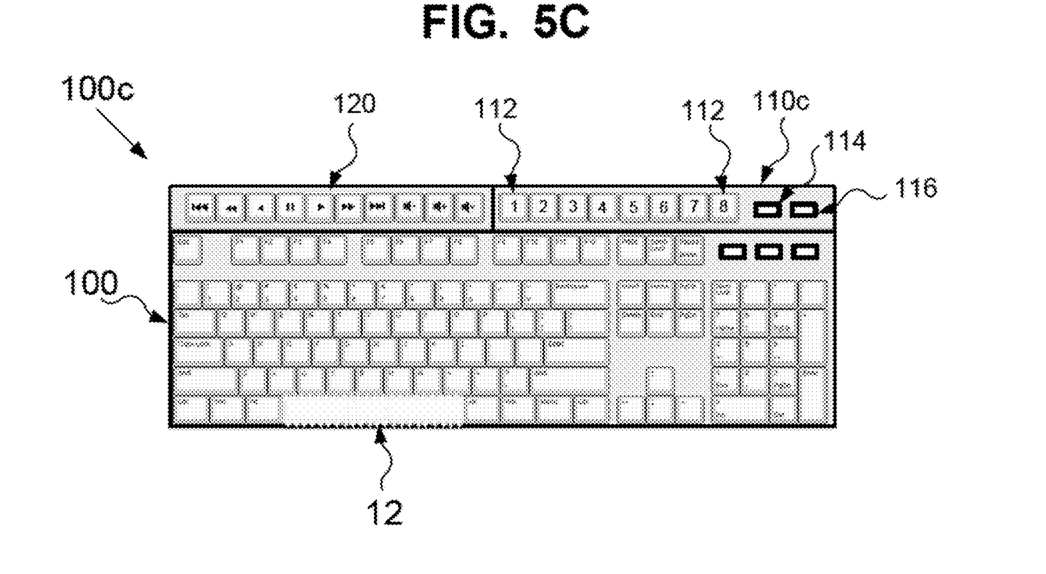

Reference is made now to FIGS. 5A-5C. FIGS. 5A-5C illustrate several variants of keyboards that support a KVM-switch. FIG. 5A illustrates a keyboard 100a including standard keyboard arrangement 100 and additional keyboard section 110a to support a KVM switch. Keyboard section 110a, in some embodiments of the invention, includes four keys 112 that to select active host similar to keys 310x of keyboard switch 300 and keys 410x of remote control 400. The four keys 112 may be labeled by the digits '1'-'4'. In addition, keyboard section 110a may include two indicators 114 and 116, e.g., LED light sources, that are used to reflect statuses from the KVM switch. The statuses may be the state of the KVM switch such as power on, initial setup in process, error indication, etc. In some embodiments of the invention, the position of keyboard section 110a is in the right side of keyboard 100.

In some embodiments of the invention, each one of keys 11 of keyboard 100a is a polychromatic illuminated key. For the sake of clarity in the figure, only the digit '6' key is illustrated as illuminated key. The internal structure of each illuminated key is illustrated in the figure inside a box above the keyboard near key 11.

Each key may include a plastic cap, coupled to a key switch, and besides or below the key switch, there is polychromatic light source. In some embodiments, the polychromatic light source may include three LEDs, each with a different color: R-RED LED, G-Green LED and B-Blue LED. This LEDs constellation also known as RGB LED. Standard 8 bit per color RGB control may provide over 16 million possible colors. Additionally or alternatively, other polychromatic light source, such as, a white light sources coupled to RGB filters or the like may be used.

KVM control keys 112 may be illuminated by polychromatic light sources as well. When a key 112 is pressed, the press event may be sent by the standard keyboard interface or alternatively by a dedicated interface between keyboard section 110a and the KVM switch to the KVM switch. When an acknowledge is received (the KVM can be switched to the host associated with this key and this host can become the active host), the key 112 illuminates in a preset color that is associated with the current active host.

In some embodiments, in order to provide the full attention of the user to the fact that it currently coupled to this specific host, all other keys of keyboard 100a are illuminated with the same color. In some embodiments, only some of the keys may be illuminated with this preset color. For example, only the alphanumeric keys 10 are illuminated or only control keys 20 or function keys 30 are illuminated.

FIG. 5B illustrates a KVM supporting keyboard 100b including an example of a standard keyboard arrangement 100 and an additional keyboard section 110b to support a KVM switch. Keyboard section 110b, in some embodiments of the invention, may include four keys 112 (keys with the same function as in keyboard section 110a) that select an active host. Keys 112 may be labeled by the digits '1'-'4'. In addition, keyboard section 110b may include a display 118 to indicate the KVM switch status. The statuses may be the state of the KVM switch such as power on, initial setup in process, error indication etc. Display 118 may indicate the number of the host that is currently active. Display 118 may be a seven-segment display. Display 118 may have a polychromatic background display that function in similar way as active host indicator 470 of remote control 400 that has been described hereinabove. In some embodiments of the invention, the position of keyboard section 110b may be in the right side of keyboard 100.

Keyboard 100b may include illuminated function keys 31. Illuminated function keys are similar to function keys 30 but includes polychromatic light source under these keys. Due to the location of function keys 31 illumination of this keys capture the attention of the users.

As in keyboard 100a, KVM control keys 112 may be illuminated by the polychromatic light source as well. Upon selection of the active host in the KVM switch, keys 31 and the appropriate key 112 are illuminated with the color associated with the active host computer. In some embodiments, display 118 displays in the same color. All other keys of keyboard 110b may be either illuminated or not illuminated. In some embodiments of the invention, all other keys of keyboard 110b are illuminated with a natural color, such as, white, yellow or blue to support well known in the art illumination for keyboard operation in dark condition. In some embodiments, these keys may be illuminated for a use in specific application. For example, some application may illuminate one or more letter keys to indicate their specific use in the application.

FIG. 5C illustrates yet another KVM. supporting keyboard 100c including standard keyboard arrangement 100 and additional keyboard section 110cto support a KVM switch. In some embodiments of the invention, the position of keyboard section 110c is in the top side of keyboard 100. In addition to the keyboard section 110c, keyboard 100c in the same top row may include multimedia extension keyboard section 120. The keyboard section 120 may include keys such as pause, paly, fast forward, volume keys and a like. Alternatively, other keyboard extensions section or keys, e.g., such as gaming keyboard extension, may be integrated to keyboard 100c (or 100a, 100b). Keyboard section 110c in some embodiments of the invention, includes eight keys 112. Keys 112 are configured to select one active host out of 8 possible hosts coupled to the KVM switch. Keys 112 here, may function similar to keys 112 in sections keyboards 110a, 100b and keys 310x and 410x in the KVM switch and the remote control respectively. Keys 112 of keyboard section 110c may be labeled by the digits '1'-'8'. In addition, two indicators 114 and 116, similar to the ones in keyboard 100a, may be used to reflect statuses from the KVM switch.

Keyboard 100c includes an illuminated space key 12. Illuminated space key 12 includes polychromatic light source under the key. Due to the location of space key 12, illumination of the space key may capture the attention of the user. As in keyboard 100a, KVM switch control keys 112 may be illuminated by the polychromatic light source as well. Upon selection of the active host in the KVM switch, key 12 and the appropriate key 112 in keyboard section 110c may be illuminated with the color associated with the active host computer. All other keys of keyboard 110c may be either illuminated or non-illuminated keys.

In some embodiments of the invention, those keys may be illuminated with a natural color, such as, white, yellow or blue to support well known in the art illumination for keyboard operation in dark condition. In some embodiments, those keys may be illuminated for a use in specific application.

Figure 6:
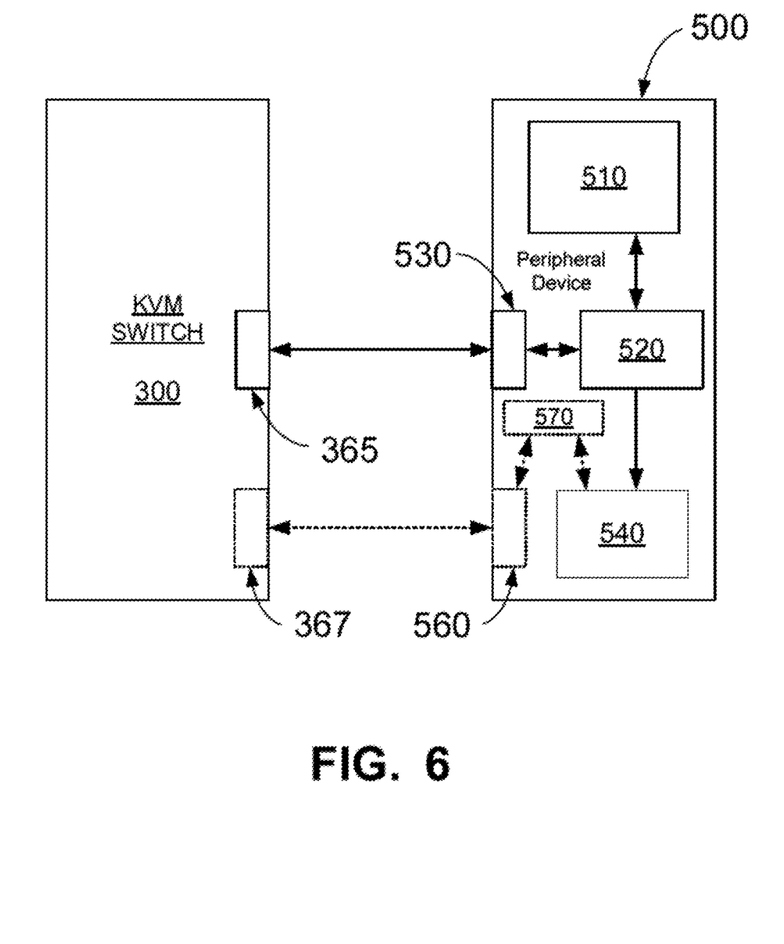
FIG. 6 is a schematic block diagram of a general peripheral device coupled to a KVM switch and supporting polychromatic indication in accordance with some embodiments of the present invention.

Reference is made now to FIG. 6. FIG. 6 is a schematic block diagram of a general peripheral device coupled to a KVM switch and supporting polychromatic indication in accordance with some embodiments of the present invention. A peripheral device 500 is coupled to a KVM switch 300 through interface 365 of KVM Switch 300 and interface 530 of peripheral device 500. Peripheral device may be any peripheral device including mouse, keyboard, microphone or any other peripheral devices mentioned hereinabove. The specific circuitry of each peripheral device is indicated by circuitry 510.

Circuitry 510 is controlled by controller 520. Controller 520 is coupled to interface 530 to receive command and communication from the active host through KVM switch 300, and to send peripheral device data to the active host through KVM switch 300. Peripheral device 500 further includes polychromatic indication 540 to illuminate in the color associated with the active host.

Additionally or alternatively, peripheral device 500 may be coupled using interface 560 to interface 367 of KVM switch 300. This connection may be used as a secondary communication channel dedicated to the polychromatic indication functionality. In some embodiments, the controller 570 may be used to control polychromatic indication 540 and to communicate with KVM switch 300 in this case.

In some embodiments of the invention, peripheral device 500 is a mouse and polychromatic indication 540 illuminates the mouse and/or the surface area around the mouse.

In some embodiments of the invention, peripheral device 500 is a microphone and the polychromatic indication 540 illuminates the microphone head whenever the microphone audio is open to the active host with the appropriate color (e.g., the indication is only active when the microphone is open for transmitting audio signals, for example, conditioned upon a push to talk button).

In some embodiments of the invention, peripheral device 500 is keyboard 100 and the polychromatic indication 540 illuminates one or more keys of keyboard 100 with the appropriate color.

In some embodiments of the invention, peripheral device 500 is smartcard reader and the polychromatic indication 540 illuminates the doorway into which the smartcard is inserted with the appropriate color.

In some embodiments, the KVNI switch 300 may support some peripheral devices to be coupled to diffirent host then the main KVM switch. For example, if an application in one host computer, e.g., host #1, needs the smartcard reader coupled to host #1 for the full process while the user wants during this time to switch and work with host #2, some KVM switch can allow this kind of operation. If host #1 is assigned to the red color and host #2 to the blue color. According some embodiments, the KVM switch may control the peripheral devices to illuminate in red while the smartcard reader is controlled to illuminate in blue.

In some embodiments, the control command to illuminate in polychromatic light source by the KVM switch 300 is performed by transfer of a data sequence including 24 bit color data (8 bit R, 8 bit G and 8 bit G) each time an active channel is changed. Additionally or alternatively, KVM switch 300 may send the color assignment for the hosts from time to time (for example after reset and when color assignment is changed) and each device that has color illumination capability may set the appropriate color based on the stored color table data stored in the device's memory. The setup of colors assignment to the KVM switch may be performed in several ways.

First, a default setup may be stored in the KVM switch during manufacturing. After deployment the setup may be changed using setup session open with one of the host or setup session perfoim by a system administrator using an external laptop coupled to special setup interface in KVM switch 300. Yet setup may be done using the key shortcuts with the keyboard. For example, the key sequence 'Ctrl'+ 'Shift'+'1' followed by six hexadecimal digit key sequence may be used to associate host #1 with the color determined by 8 bit (two hexadecimal digits) for the red component 8 bit for the green component and 8 bit for the blue component. For example, typing Ctrl+Shift+2, "800080" may assign a purple color, RGB (128, 0, 128), to host #2 of the KVM switch.

Figure 7:
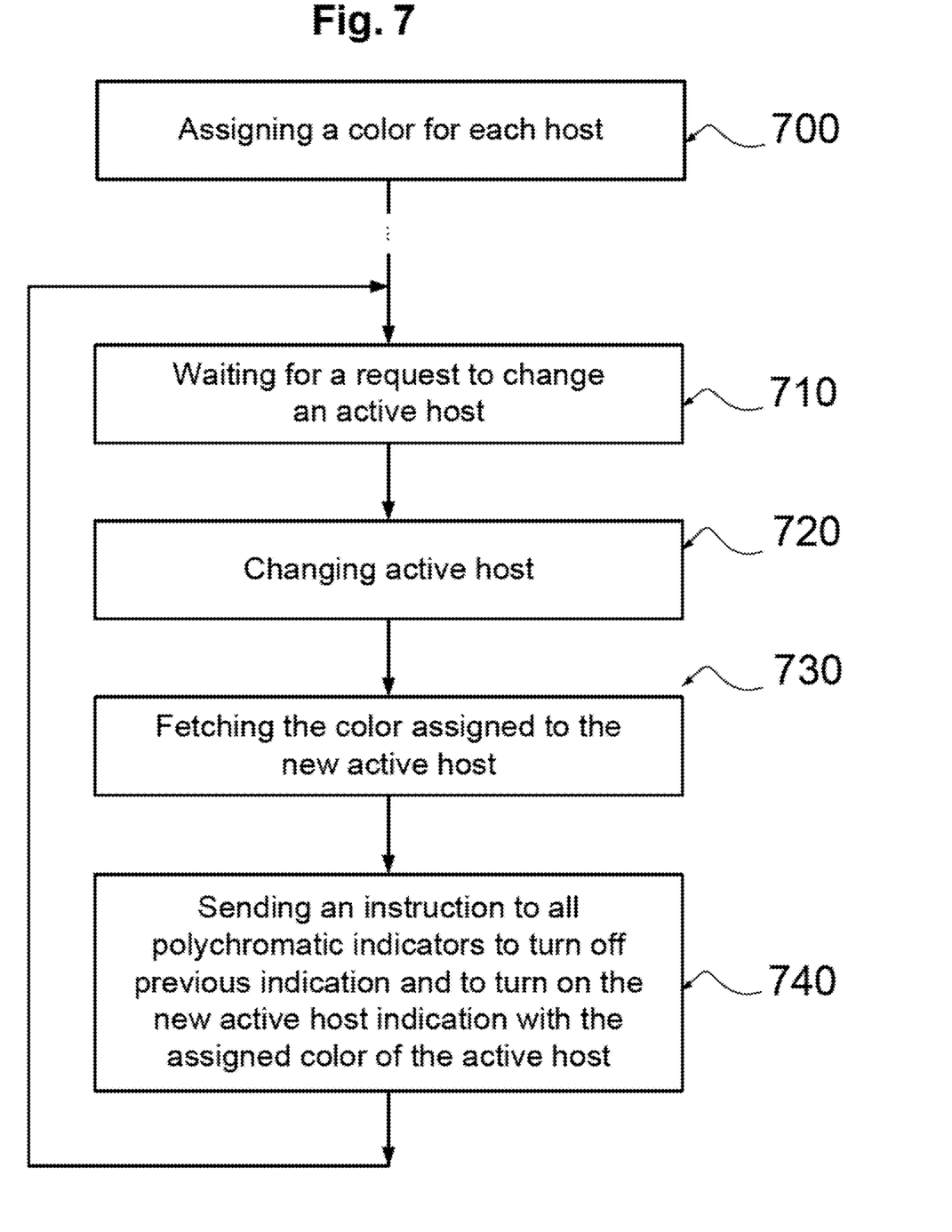
FIG. 7 is a flow chart of the KVM switch controller according to some embodiments of the present invention.

Reference is made now to FIG. 7. FIG. 7 is a flow chart of a method for that can be executed by the KVM switch controller according to some embodiments of the present invention.

In step 700 the controller can store for each host port of the KVM switch a color. The color may be assigned through several methods. The default assignment of colors to the hosts may be made in the factory. For example, a two-hosts KVM switch may be pre-set to a setup where host #1 assigned with green color and host #2 assigned with red color.

Additionally or alternatively, the setup can be changed dynamically during operation using a configuration port in the KVM switch. For example, a system administrator may couple his laptop to a special configuration interface or, for example, to the mouse USB port of the KVM switch, open a terminal connection, and in this special setup session, among other tasks, sets the color of each host in the system. Yet another option for the color-host assignment of the KVM switch, may be to set using a software running on one of the hosts in any time by the user. Color assignment may also be performed by typing key sequence from the keyboard (e.g., keyboard shortcuts).

In step 710, the KVM switch controller can wait for a request to change the active host from the user. The request event may come from several sources: key press in any device in the KVM system that have switching host keys such as 310*x*, 410*x* 112, and/or other switching host keys as are known in the art; keyboard and/or mouse shortcuts; and/or a mouse movement that crosses display boundaries in a single virtual display that includes several physical displays that can be driven from several hosts. After receiving the request to change the active host, in step 720, the KVM switch controller may perform the actual switching or the routing of the peripheral device to the new active host. Step 710-730 can include receiving from the user, a switching command, selecting an active host accordingly, and coupling the active host to the user's set of peripheral devices.

Next, in step 730 the KVM switch controller can fetch the color assigned to the new active host and in step 740 the KVM switch controller can update the indicators to the user by sending an instruction to all indicators that indicates the active host to the user. Steps 740 and 750 can indicate the active host to the user by illuminating in the color assigned to the active host computer. The indicators may be on the KVM switch enclosures, the KVM remote control enclosure, the keyboard or any other peripheral device coupled to the KVM switch. For all polychromatic indication the KVM switch may send with the instruction the color to be illuminated. In some embodiments, the color information for each active host is instructed in advance to each device with polychromatic indicator.

The communication between the KVM switch and the external indicators may be performed using a dedicated connection or an existing connection. For example, the connection with the remote control may be performed using RS232. The communication with a peripheral device may be performed using USB were the indicator is implemented as independent USB device in multidevice USB device were the other device is the HID device.

In some embodiments, the user awareness is increased for the host as he works with in a multi host environment and/or multi network environment and/or with multi security levels environment. Security breach by the user is prevented due to the association built in the user's mind between the color of the host and/or network and the security rules apply in each host and/or network. In some embodiments, the indication system includes a subsystem to ensure the color indication system is working properly. This may be performed by measuring the current consumption of each monochromatic light source in this subsystem and if the current consumption is not as expected, e.g., indication of a failure in the light source, the system may alert the user or the administrator or disable the indication system. Additionally or alternatively, a sensor based failure detection system may be used.

In some embodiments of the invention, a peripheral devices switching system configured to be coupled to a plurality of host computers includes: at least one set of peripheral devices; a peripheral devices switch and one or more polychromatic light sources. The peripheral devices switch 300 can be configured to be coupled to said at least one set of peripheral devices and said plurality of host computers, where the peripheral devices switch assigns a color to each host computer of the plurality of host computers, and the peripheral devices switch 300 couples between said at least one set of peripheral devices and an active host computer of the plurality of host computers. The one or more polychromatic light sources can be included in the peripheral devices switch, the at least one of the peripheral devices of the sets of peripheral devices or both. The peripheral devices switch 300 can indicate the active host computer by, for example, illuminating at least one of or a combination of the light sources by the color that is assigned to the active host computer.

The terms "comprises", "comprising", "includes", "including", "having" and their conjugates mean "including but not limited to".

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

While certain features of the invention have been illustrated and described in conjunction with specific embodiments thereof, it is evident that many alternatives, modifications, variations, substitutions, changes, and equivalents will be apparent to those skilled in the art. It is, therefore, to be understood that the appended claims are intended to embrace all such alternatives, modifications, variations, substitutions, changes, and equivalents as fall within the true spirit and broad scope of the invention.

Various embodiments have been presented. Each of these embodiments may of course include features from other embodiments presented, and embodiments not specifically described may include various features described herein.

The invention claimed is:

1. A peripheral devices switching system configured to be coupled to a plurality of host computers, the system comprising:
   at least one set of peripheral devices, wherein at least one peripheral device of the at least one set of peripheral devices comprises one or more polychromatic light sources; and
   a peripheral devices switch that is configured to be coupled to said at least one set of peripheral devices and said plurality of host computers, wherein the peripheral devices switch is configured to be assigned with a color corresponding to each host computer of the plurality of host computers, and wherein the peripheral devices switch is configured to couple between said at least one set of peripheral devices and an active host computer of the plurality of host computers,
   wherein the peripheral devices switch is configured to indicate the active host computer by instructing the at least one peripheral device to illuminate the one or more polychromatic light sources by the color that is assigned to the active host computer.

2. The system of claim 1, wherein the peripheral devices switch further comprises a remote control.

3. The system of claim 1, wherein the set of peripheral devices comprises a keyboard that comprises one or more polychromatic light source located under or adjacent to one or more keys of said keyboard.

4. The system of claim 1, wherein the set of peripheral devices comprises a pointing device that comprises one or more polychromatic light source.

5. The system of claim 1, wherein the set of peripheral devices comprises a microphone and comprises one or more polychromatic light source and when the microphone is open to the active host, the one or more polychromatic light source illuminate in the color assigned to the active host computer that receive voice signals from said microphone.

6. The system of claim 1, wherein the one or more polychromatic light source comprises Red-Green-Blue (RGB) LEDs.

7. The system of claim 1, wherein the one or more polychromatic light source comprises two or more monochromatic light sources.

8. The system of claim 1, wherein the peripheral devices switch is a secured peripheral devices switch.

9. A keyboard configured to be coupled with a KVM switch, the keyboard comprising:
   a plurality of standard keyboard keys, wherein the keys are associated with one or more polychromatic light sources;
   a controller; and
   an interface configured to enable communication between the controller and the KVM switch,
   wherein the controller is configured to receive instructions from the KVM switch, -and condition upon said instructions the controller activates the one or more polychromatic light sources to illuminate with a color assigned to a host coupled to the KVM switch.

10. The keyboard of claim 9, wherein the keyboard further comprises a plurality of KVM control keys,
   wherein the plurality of KVM control keys comprise one or more polychromatic light sources, each KVM control key of the plurality of KVM control keys being configured to select an active host by the KVM switch,
   wherein the controller scans the plurality of KVM control keys and upon pressing any KVM control keys sends a message to the KVM switch through the interface,
   wherein the KVM switch instructs the controller to illuminate the keyboard with a color assigned to the active host, and
   wherein, conditioned upon the KVM switch instruction, the controller controls the one or more polychromatic light sources to illuminate a corresponding KVM control key with the color assigned to the active host.

11. The keyboard of claim 9, wherein the interface is one of (a) Serial; (b) PS/2; and (c) USB interface.

12. The keyboard of claim 9, wherein the illumination of the plurality of standard keyboard keys is performed using RGB LEDs.

13. The keyboard of claim 9, wherein the controller receives messages through the interface from the KVM switch on event of switching active host, said messages comprises color information.

14. The keyboard of claim 9, wherein said plurality of standard keyboard keys comprises any one of or any combination of (a) Latin letters (a-z) keys, (b) digit keys, (c) punctuation keys, (d) symbol keys, (e) control keys, (f) function keys, (g) navigation keys, (h) numeric keypad keys, and (i) any non-Latin letter keys.

15. The keyboard of claim 9, wherein said plurality of standard keyboard keys complies with ISO/IEC 9995 keyboard standard series.

16. A method of indicating an active host computer of a plurality of host computers while working with a peripheral devices switch, the method comprises:
   (a) receiving a color assigned to each of the plurality of host computers;
   (b) receiving a switching command that indicates a particular host computer of the plurality of host computers to be coupled to the peripheral devices switch, wherein the particular host computer is the active host computer;
   (c) coupling, by the peripheral devices switch, the active host computer to at least one set of peripheral devices; and
   (d) illuminating one or more polychromatic light sources located in at least one peripheral device of the set of peripheral devices to indicate the active host computer, wherein the illumination is with the color assigned to the active host computer.

17. The method of claim 16, wherein the peripheral devices switch further comprises a remote control with polychromatic light sources, and wherein step (d) is performed by illuminating the polychromatic light sources of the remote control.

18. The method of claim 16, wherein the at least one set of peripheral devices comprises a keyboard with polychromatic light sources, and wherein step (d) is performed by illuminating the polychromatic light sources of the keyboard.

19. The method of claim 16, wherein in step (c) a selected peripheral device is coupled to a selected host computer which is different from the host computer coupled to all other peripheral devices in the at least one set of peripheral devices, and wherein in step (d) said selected peripheral device is indicated by illuminating the selected peripheral device using the assigned color for the selected host computer.

20. The method of claim 16, wherein the polychromatic light sources are RGB LEDs.

21. The method of claim 16, wherein the peripheral devices switch is secured peripheral devices switch.

* * * * *